United States Patent [19]

Parker et al.

[11] Patent Number: 4,909,597
[45] Date of Patent: Mar. 20, 1990

[54] FLEXIBLE OPTICAL WAVEGUIDE CONTAINING A THERMOPLASTIC ALIPHATIC SEGMENTED POLYURETHANE CORE

[75] Inventors: Theodore L. Parker, Walnut Creek; David R. Pedersen, Clayton; Nathan N. Haese, Walnut Creek, all of Calif.

[73] Assignee: The Dow Chemical Company, Midland, Mich.

[21] Appl. No.: 314,728

[22] Filed: Feb. 23, 1989

[51] Int. Cl.$^4$ ............................................. G02B 1/04
[52] U.S. Cl. ................................. 350/96.34; 350/96.12
[58] Field of Search ........................... 350/96.34, 96.12

[56] References Cited

U.S. PATENT DOCUMENTS

| | | | |
|---|---|---|---|
| 4,311,726 | 1/1982 | Hacker et al. | 350/96.12 X |
| 4,552,431 | 11/1985 | Allemand et al. | 350/96.34 |
| 4,708,833 | 11/1987 | Ohsawa et al. | 350/96.34 X |
| 4,740,055 | 4/1988 | Kanda et al. | 350/96.34 X |
| 4,743,629 | 5/1988 | Karakelle | 521/175 |
| 4,783,135 | 11/1988 | Utsumi et al. | 350/96.34 X |
| 4,826,284 | 5/1989 | Sakagami et al. | 350/96.34 |

OTHER PUBLICATIONS

"Fiber Optics," Kirk-Othmer: Encyclopedia of Chemical Technology, 3rd edition, vol. 10, John Wiley & Sons, New York, 1980, pp. 125-147.

"Fibers, Optical," Encyclopedia of Polymer Science and Engineering, vol. 7, John Wiley & Sons, New York, 1986, pp. 1-15.

"Silicones," Kirk-Othmer: Encyclopedia of Chemical Technology, 3rd edition, vol. 20, John Wiley & Sons, New York, 1982, pp. 922-962.

"Urethane Polymers," Kirk-Othmer: Encyclopedia of Chemical Technology, 3rd edition, vol. 23, John Wiley & Sons, New York, 1983, pp. 576-607.

Primary Examiner—John D. Lee
Assistant Examiner—Phan T. Heartney

[57] ABSTRACT

The invention is a novel polymer optical waveguide which contains a thermoplastic aliphatic segmented polyurethane core.

16 Claims, 1 Drawing Sheet

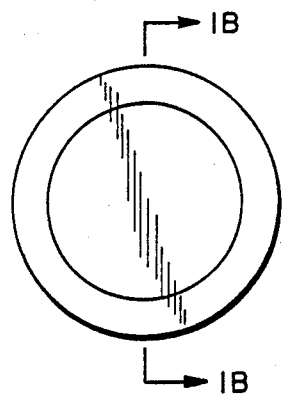
FIG._1A.
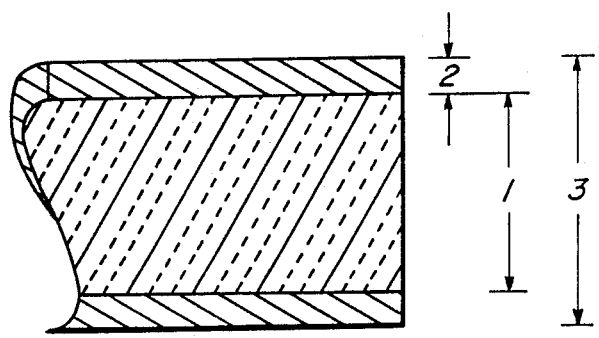
FIG._1B.
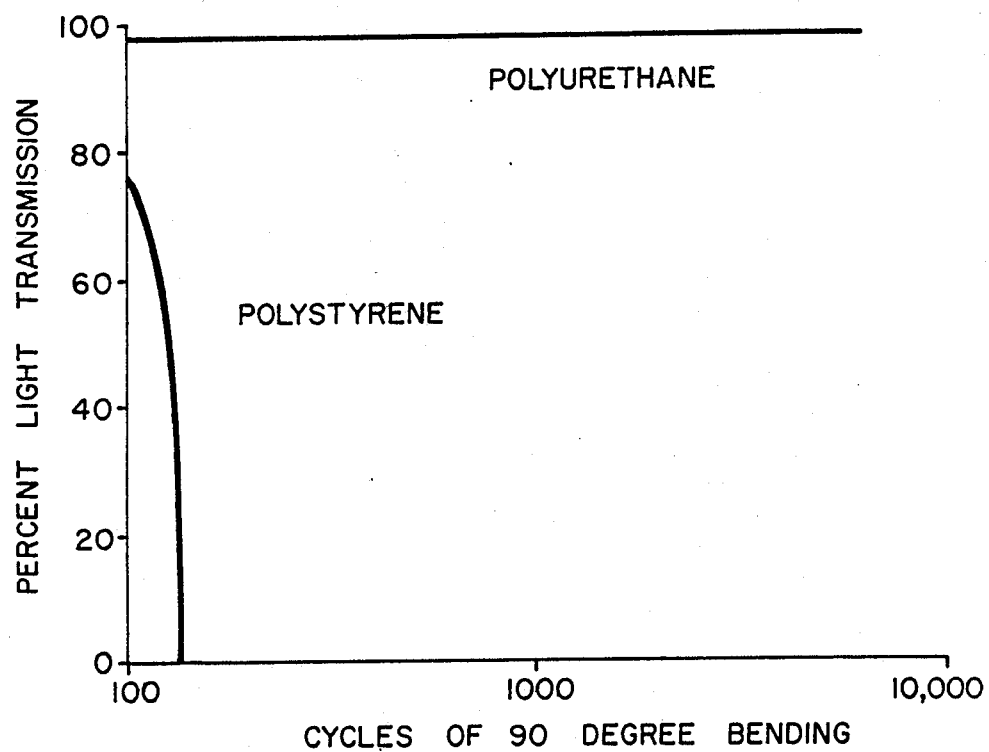
FIG._2.

FLEXIBLE OPTICAL WAVEGUIDE CONTAINING A THERMOPLASTIC ALIPHATIC SEGMENTED POLYURETHANE CORE

BACKGROUND OF THE INVENTION

This invention relates to a novel polymer optical waveguide possessing a high degree of flexibility. More particularly, the polymer optical waveguide of this invention contains a thermoplastic aliphatic segmented polyurethane core.

An optical waveguide comprises a core of a material which transmits light and a clad surrounding the core wherein the refractive index of the clad is lower than the refractive index of the core, such that lightwaves transmitted down the core are not refracted out at the core/clad interface but are instead reflected back into the core of the waveguide. The light transmitted through the optical waveguide can be used for illumination, data transmission, and other optical and information transmission purposes. An optical waveguide must be comprised of a material which is optically clear with low attenuation. Low attenuation means the optical waveguide loses little light as the light is transmitted down the waveguide. The optical waveguide must possess sufficient flexibility to be able to withstand handling and bending during processing and use without deleteriously affecting its physical integrity or light transmitting capabilities. An optical waveguide should also possess sufficient strength and sufficient temperature use capability.

Early optical waveguides were predominantly comprised of silica glass. However, optical waveguides comprised of glass possess a low degree of flexibility. The elongation at break is low and the bending radius at break is large. Glass optical waveguides are also low in strength with respect to impact shock and twisting. More recently, optical waveguides have been fabricated from optically clear polymers which transmit light. Polymer optical waveguides to date have been fabricated from relatively hard, glassy polymers such as acrylics or styrenics. These glassy polymers also possess a low degree of flexibility.

What is needed is a polymer optical waveguide with low attenuation and a high degree of flexibility. Sufficient strength and sufficient temperature use capability are also needed.

SUMMARY OF THE INVENTION

The invention is a polymer optical waveguide comprising:
(a) a core comprising a flexible thermoplastic aliphatic segmented polyurethane; and
(b) a clad comprising a flexible material which adheres to the core and possesses a lower refractive index than the thermoplastic aliphatic segmented polyurethane core;
wherein the optical waveguide transmits light through the core.

The polymer optical waveguides of this invention possess low attenuation and a high degree of flexibility. These polymer optical waveguides are well able to withstand handling and bending during fabrication and use without deleterious impact on physical integrity or light transmission properties. Furthermore, the polymer optical waveguides of this invention possess sufficient strength and sufficient temperature use capabilities.

BRIEF DESCRIPTION OF THE DRAWING

FIGS. 1A and 1B illustrate a portion of an optical fiber core surrounded by cladding.

FIG. 2 illustrates the percent of light transmission as a function of cycles of 90° bending for the polyurethane and polystyrene optical fibers of Example 2.

DETAILED DESCRIPTION OF THE INVENTION

The core is comprised of a flexible thermoplastic aliphatic segmented polyurethane which is capable of transmitting light. Thermoplastic aliphatic segmented polyurethanes preferred in the present invention are described by Collins, U.S. Pat. No. 4,621,113, incorporated herein by reference. Such thermoplastic aliphatic segmented polyurethanes are formed from reactions between glycols, diisocyanates, and chain extenders. Such thermoplastic aliphatic segmented polyurethanes are preferably comprised of alternating soft and hard segments, (1) said soft segments being derivable from the reaction of
   (a) generally linear molecules terminated at each end by an isocyanate group and consisting of
      (i) n residues of one or more methylolterminated polyether glycols having molecular weights of from about 1000 to about 6000 and consisting essentially of chains of $-O-CRR^1-CH_2-$ units in which each of R and $R^1$ is independently hydrogen, methyl, or ethyl, except that in at least a preponderance of said units one or the other of R and $R^1$ is not hydrogen, and
      (ii) (n+1) residues of one or more nonaromatic diisocyanates joined to said polyether glycol residues by intervening carbamate groups,
   n ranging from 1 to about 4 and having an average value of from about 1.5 to about 1, and
(2) said hard segments being derivable from the reaction of a chain extender with the isocyanate end groups in said molecules and with one or more non-aromatic non-polymeric diisocyanates of a nature such that the resulting carbamate groups will be unable to associate with each other in such a manner as to result in domain crystallinity in the resulting polymer.

Preferred glycols include glycols predominantly derivable from branched $C_{3-6}$ alkylene oxides, although some ethylene oxide derivable units may be included, so long as the essential effect of branched units on the character of the pre- and final polymers is retained and phase crystallization does not occur. The amount of ethylene oxide units to branched alkylene oxide units is preferably less than about 20 weight percent. More preferred are glycols predominantly derivable from propylene oxide and/or butylene oxide. Especially preferred glycols are poly(oxypropyleneoxyethylene)-glycol, for example, VORANOL ®5287 diol (® trademark of The Dow Chemical Company) with a molecular weight of about 2000, and poly(oxybutyleneoxyethylene)glycol.

Preferred diisocyanates comprise no aromatic moieties and comprise only aliphatic and/or cycloaliphatic moieties. Preferred diisocyanates include polymethylene diisocyanates, methylene bis(4-cyclohexylisocyanate), 1,4-bis(isocyanatomethyl)cyclohexane, cyclohexane-1,4-diisocyanate, 2,2,4-trimethylhexamethylene diisocyanate, di(isocyanatoethyl)carbonate, lysine diisocyanate, 1,6-diisocyanato-2,2,4,4-tetramethylhexane, isophorone diisocyanate, 1,8-diisocyanato-p-menthane, 1,6-diisocyanato-2,4,4-trimethylhexane, isopropylidine bis(4-isocyanatocyclohexane), 1,4-dimethylene isocyanatocyclohexane, and 1,3-dimethylene isocyanatocyclohexane.

Preferred chain extenders include aliphatic $C_{2-4}$ straight chain and branched chain diols, diamines and hydroxyamines; hydrazine and piperazine; cyclo—and dicycloaliphatic diols, diamines or hydroxy amines having up to 12 carbons, hydroquinone and resorcinol—as such or as the bis(2-hydroxyethyl)ethers; and aromatic and heteromatic nuclei—as such or hydrogenated, and substituted with two groups which are methyol and/or aminomethyl. More preferred chain extenders include aliphatic $C_{2-4}$ straight and branched chain diols and cyclohexane dimethanol. Higher functionality hydroxy and/or amino compounds considered suitable chain extenders include pentaerythritol, trimethylol propane and N(-2-hydroxypropyl)ethylenediamine. Other suitable types of chain extenders include fluorine-substituted, difunctional active hydrogen compounds, for example, 1,2,3,3,4,4-hexafluoropentane-1,5 diol and phenyl substituted $C_{2-5}$ diols, preferably 2-phenyl-1,3-propylene glycol or phenyl-1,4-butylene glycol.

The mole ratio of glycol:diisocyanate:chain extender is preferably in the range of about 1:3:2 to about 1:15:14, more preferably from about 1:4:3 to about 1:6:5. The thermoplastic aliphatic segmented polyurethanes are prepared by first reacting the glycol and diisocyanate to form a prepolymer, then reacting diisocyanate to form such polyurethanes. The weight-average molecular weight of such polyurethanes is preferably in the range of from about 100,000 to about 200,000.

The Shore hardness of the polyurethanes of this invention preferably ranges from about A45 to about D80 as measured by ASTM D 2240-88. The maximum use temperature of such thermoplastic aliphatic segmented polyurethanes is preferably about 60° C. or greater, more preferably about 80° C. or greater. The refractive index at 25° C. of such thermoplastic aliphatic segmented polyurethanes is preferably in the range of from about 1.45 to about 1.55.

The clad is comprised of a flexible material which adheres to the core and possesses a lower refractive index than the thermoplastic aliphatic segmented polyurethane core. The adhesion between the core and the clad must be such that during handling or use of the optical waveguide, the clad does not separate from the core. The material used for the clad must possess a lower refractive index than the core material, so that as light is transmitted and reflected in the direction of the core, the clad functions to reflect the light back into the core of the optical waveguide so that it may continue down the core. The clad preferably possesses a refractive index which is at least about 0.01 units less than the refractive index of the core, more preferably at least about 0.02 units less than the refractive index of the core.

Preferred clad materials include polysiloxanes. Polysiloxanes are described in *Kirk-Othmer Encyclopedia of Chemical Technology.* Vol. 20, John Wiley & Sons, New York, N.Y., 1982, pp. 922-962, the relevant portions incorporated herein by reference. Preferred polysiloxanes include aliphatic polysiloxanes. Especially preferred polysiloxanes for use in this invention are UV curable siloxanes available from Dow Corning as Grade DC-6256-100 and Grade X3-6735.

The polymer optical waveguides of this invention may be of any length, shape, or arrangement known to one skilled in the art. The optical waveguides may have a cross-section which is circular, oval, square, rectangular, triangular, annular, or other shape. In the case of an annular cross-section, the optical waveguide may be in the shape of a hollow light pipe wherein the core is a hollow light pipe and the clad surrounds the hollow light pipe core. In the hollow light pipe configuration, the clad may also surround the core and cover the inside of the core in the light pipe. The optical waveguides preferably possess a circular cross-section. (See FIG. 1.) The polymer optical waveguides may be arranged in a ribbon or tape configuration consisting of an n x n array wherein n is an integer of greater than/equal to 1 or in a bundle configuration.

The polymer optical waveguides of this invention may be prepared by any process known to one skilled in the art of preparing optical waveguides. One process involves forming the core and clad in a preform which is thereafter heated to a temperature at which the core and clad may be drawn down to an appropriate size for the polymer optical waveguide. In another process, the core is extruded and then the clad may be coated on the core and thereafter cured in place. The use of cup coating techniques may generally be used and any curing mechanism which adequately cures the clad to the core is suitable, for example, heat cure or ultraviolet (UV) cure. In still another process, the optical waveguides may be formed by a co-extrusion process in which the core and clad are simultaneously extruded to form the desired shape. In the co-extrusion process, the core material and the clad material are separately heated to a temperature suitable for extrusion and the materials are thereafter extruded. Molten core and clad materials are brought together in a die. The extrusion temperature is dependent upon the particular core and clad materials and the temperature used must be suitable for both materials. During co-extrusion, it is important to match the viscosity of the materials, such that under temperature and shear conditions the viscosity of the clad is equal to or less than the viscosity of the core.

In a preferred process, the core is first extruded and the clad is then coated onto the core and cured in place. The thermoplastic aliphatic segmented polyurethane polymer used for the core is preferably dried prior to extrusion. The polyurethane is then heated to a temperature to form a melt suitable for extrusion. For the polyurethanes useful in this invention, the extrusion temperature is preferably between about 150° C. and about 200° C., more preferably between about 160° C. and about 190° C. The polyurethane melt is preferably filtered prior to extrusion in order to remove particles greater than about 10 microns, more preferably of greater than about 2 microns. The polyurethane is extruded through a die to produce an extrudate with the desired cross-sectional shape. The extrudate is cooled and drawn down to the desired size. In the preferred embodiment wherein the optical waveguide possesses a circular cross-section, the extrudate is drawn down to produce a fiber possessing a diameter of between about 0.1 millimeters and 2.0 millimeters, more preferably between about 0.5 millimeters and about 1.0 millimeters. FIG. 1 illustrates an optical fiber with a core diameter (1), clad thickness (2), and total fiber diameter (3).

The clad material is then coated onto the polyurethane core by dipping, cup-coating, spraying, or other conventional techniques. A thin coating of the clad material is thus deposited on the core surface. The coating is thereafter cured by heating or UV radiation. Where the preferred clad material is polysiloxane, the clad is usually UV cured. The thickness of the clad is preferably between about 1 micron and about 100 microns, more preferably between about 5 microns and about 25 microns.

The polymer optical waveguides of this invention are useful for transmitting light possessing wavelengths between about 400 and about 900 nanometers. The polymer optical waveguides of this invention possess an attenuation over the wavelength range of about 500 to about 800 nanometers of preferably less than about 30 decibels/meter, more preferably less than about 25 decibels/meter.

The polymer optical waveguides of this invention possess a high degree of flexibility. The degree of flexibility may be characterized by the percent of light transmission as a function of 90° bending cycles as described in Example 2. The optical waveguides of the present invention retain at least about 98% light transmission after 1000 90° bending cycles.

The polymer optical waveguides of this invention have a maximum use temperature of preferably about 60° C. or greater, more preferably of about 80° C. or greater.

SPECIFIC EMBODIMENTS

The following examples are presented for illustration only and are not intended to limit the scope of the invention or claims in any way.

EXAMPLE 1

Polymer Optical Fiber With Polyurethane Core And Polysiloxane Clad

A thermoplastic aliphatic segmented polyurethane of mole composition 1:6:5 VORANOL ® 5287 diol: hydrogenated methane diisocyanate: 1,4-butanol, obtainable from The Dow Chemical Company under the product designation polyurethane thermoplastic elastomer XU-63111.03, is extruded at about 195° C. in a RAM extruder into a solid fiber about 0.2 millimeters in diameter. The fiber is then coated with about a 0.05 millimeter layer of uncured polysiloxane, obtainable from The Dow Corning Corporation under the product designation UV cured siloxane Grade DC 6256-100, by passing the fiber through a cup-coating apparatus available from Heathway, Incorporated. The coated core is exposed to a high intensity UV lamp for about 1 second in order to cure the clad.

The refractive index of the core is about 1.49. The refractive index of the clad is about 1.42. The light attenuation at about 650 nanometers for the fiber is found to be about 20 decibels/meter.

EXAMPLE 2

Flexibility of Polyurethane Fiber

The percent light transmission as a function of the number of 90° bending cycles about a post of 2 millimeter radius is determined for 0.75 millimeter diameter fibers of polystyrene and the polyurethane composition of Example 1.

Data are shown in FIG. 2. The polyurethane fiber retains about a constant about 98% light transmission over about 7,000 90° bending cycles, whereas the polystyrene fiber percent light transmission decreases from about 76% at about 100 90° bending cycles to 0% at about 130 90° bending cycles.

What is claimed is:

1. A polymer optical waveguide comprising:
   (a) a core comprising a flexible thermoplastic aliphatic segmented polyurethane; and
   (b) a clad comprising a flexible material which adheres to the core and which possesses a lower refractive index than the aliphatic polyurethane core; wherein the optical waveguide transmits light through the core.

2. A polymer optical waveguide comprising:
   (a) a core comprising a flexible thermoplastic aliphatic segmented polyurethane; and
   (b) a clad comprising a flexible material which adheres to the core and which possesses a lower refractive index than the aliphatic polyurethane core; wherein the thermoplastic aliphatic segmented polyurethane is comprised of alternating soft and hard segments,
      (1) said soft segments being derivable from the reaction of
      (a) generally linear molecules terminated at each end by an isocyanate group and consisting of
         (i) n residues of one or more methylolterminated polyether glycols having molecular weights of from about 1000 to about 6000 and consisting essentially of chains of $-O-CRR^1-CH_2-$ units in which each of R and $R^1$ is independently hydrogen, methyl, or ethyl, except that in at least a preponderance of said units one or the other of R and $R^1$ is not hydrogen, and
         (ii) (n+1) residues of one or more non-aromatic diisocyanates joined to said polyether glycol residues by intervening carbamate groups,
      n ranging from 1 to about 4 and having an average value of from about 1.5 to about 1, and
      (2) said hard segments being derivable from the reaction of a chain extender with the isocyanate end groups in said molecules and with one or more non-aromatic non-polymeric dissocyanates of a nature such that the resulting carbamate groups will be unable to associate with each other in such a manner as to result in domain crystallinity in the resulting polymer,
   wherein the optical waveguide transmits light through the core.

3. The polymer optical waveguide of claim 2 wherein the polyurethane comprises a mole ratio of glycol:diisocyanate:chain extender of about 1:3:2 to about 1:15:14.

4. The polymer optical waveguide of claim 3 wherein the weight-average molecular weight of the polyurethane is between about 100,000 and about 200,000.

5. The polymer optical waveguide of claim 4 wherein the glycol is predominantly derivable from $C_{3-6}$ alkylene oxides.

6. The polymer optical waveguide of claim 5 wherein the diisocyanate is selected from the group consisting of polymethylene diisocyanates, methylene bis(4-cyclohexylisocyanate), 1,4-bis(isocyanatomethyl)cyclohexane, cyclohexane-1,4-diisocyanate, 2,2,4-trimethylhexamethylene diisocyanate, di(isocyanatoethyl)carbonate, lysine diisocyanate, 1,6-diisocyanato-2,2,4,4-tetramethylhexane, isophorone diisocyanate, 1,8-diisocyanato-p-menthane, 1,6-diisocyanato-2,4,4-trimethylhexane, isopropylidine bis(4-isocyanatocyclohexane), 1,4-dimethylene isocyanato cyclohexane, and 1,3-dimethylene isocyanatocyclohexane.

7. The polymer optical waveguide of claim 6 wherein the chain extender comprises aliphatic $C_{2-4}$ straight chain and branched chain diols or cyclohexane dimethanol.

8. The polymer optical waveguide of claim 7 wherein the polyurethane possesses a refractive index of between about 1.45 and about 1.55.

9. The polymer optical waveguide of claim 8 wherein the polyurethane has a Shore hardness of between about A45 and about D80 as measured by ASTM D2240-86.

10. The polymer optical waveguide of claim 9 wherein the clad has a refractive index which is at least 0.01 units less than the refractive index of the core.

11. The polymer optical waveguide of claim 10 wherein the clad comprises polysiloxane.

12. The polymer optical waveguide of claim 11 wherein the attenuation over the wavelength range of about 500 to about 800 nanometers is less than about 30 decibels/meter.

13. The polymer optical waveguide of claim 12 which has a maximum use temperature of about 60° C. or greater.

14. The polymer optical waveguide of claim 13 wherein the polymer optical waveguide possesses a circular cross-section.

15. The polymer optical waveguide of claim 14 wherein the core has a diameter of between about 0.1 and about 2.0 millimeters.

16. The polymer optical waveguide of claim 15 wherein the clad has a thickness of between about 1.0 and about 100 microns.

* * * * *

UNITED STATES PATENT AND TRADEMARK OFFICE
CERTIFICATE OF CORRECTION

PATENT NO. : 4,909,597

DATED : March 20, 1990

INVENTOR(S) : T. L. Parker et al.

It is certified that error appears in the above-identified patent and that said Letters Patent is hereby corrected as shown below:

Col. 3, line 31, after "reacting" insert -- the prepolymer with chain extender and additional --.

Signed and Sealed this

Third Day of March, 1992

Attest:

HARRY F. MANBECK, JR.

*Attesting Officer*      *Commissioner of Patents and Trademarks*